FIG. 3
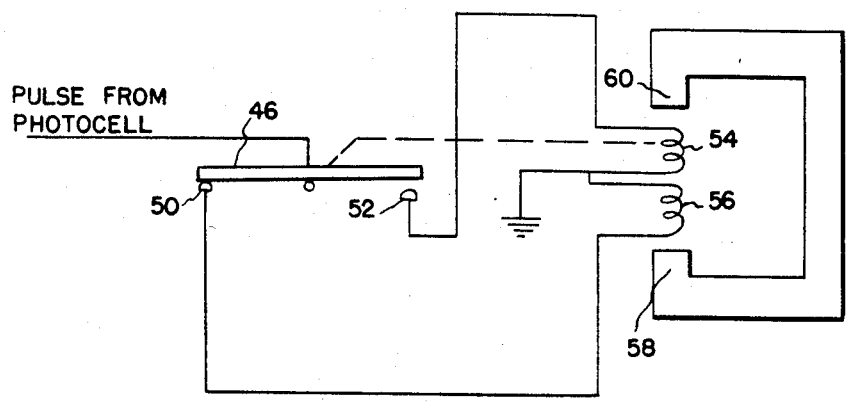
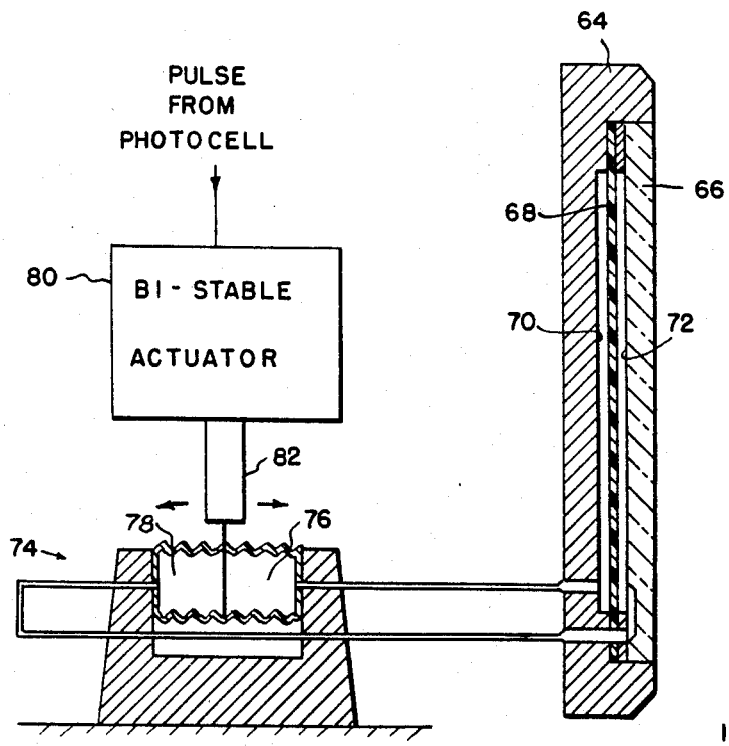
FIG. 4

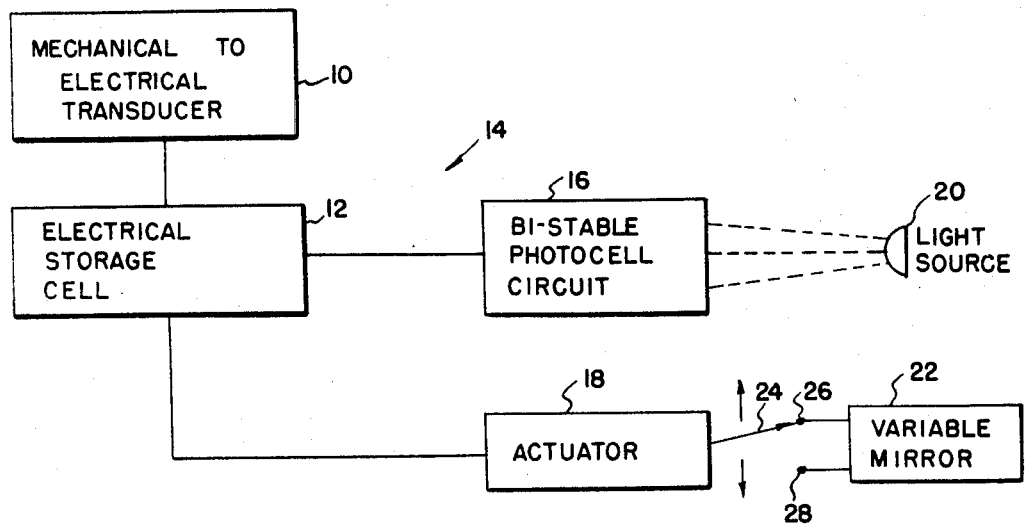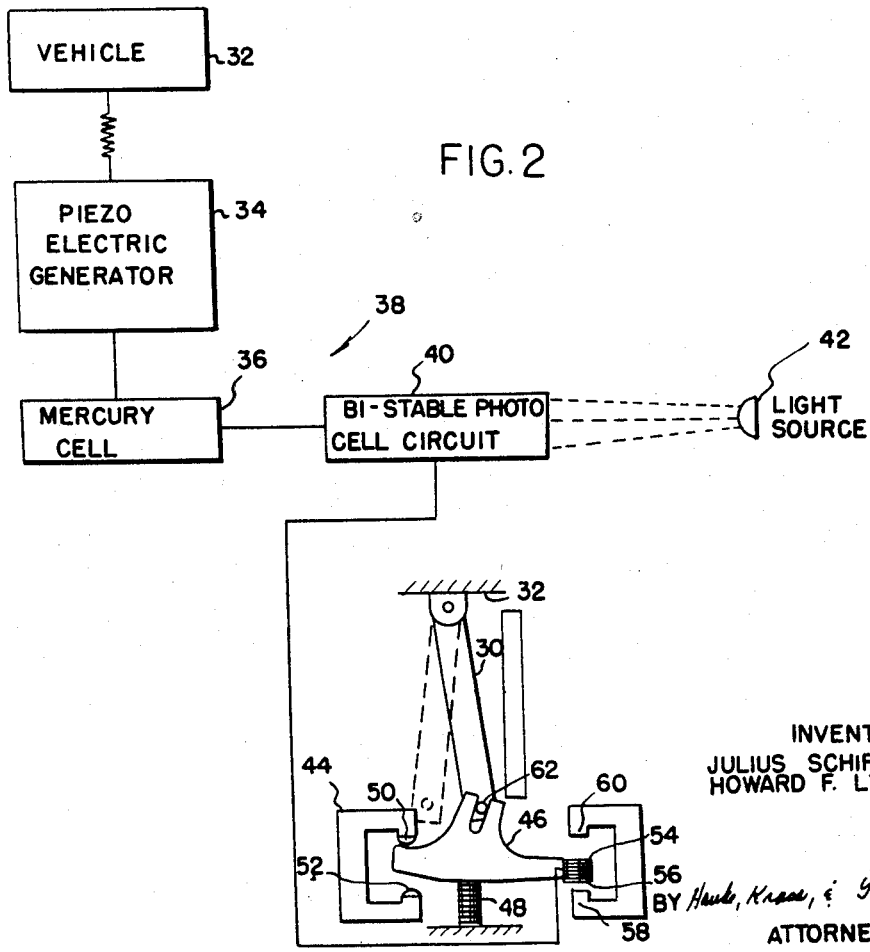

United States Patent Office 3,510,205
Patented May 5, 1970

3,510,205
MIRROR APPARATUS WITH AUTOMATIC DIMMING CONTROL
Julius Schiffman, Huntington Woods, and Howard F. Lynn, Livonia, Mich., assignors to Chain Lakes Research Associates, Inc., Detroit, Mich., a corporation of Michigan
Filed Apr. 5, 1967, Ser. No. 628,735
Int. Cl. G02b 17/00, 5/10
U.S. Cl. 350—279                2 Claims

ABSTRACT OF THE DISCLOSURE

A self-contained automatic dimming apparatus for a mirror mounted on a vehicle. A piezo-electric generator excited by the vibrations of the moving vehicle provides a source of electrical energy to a mercury cell. A photocell circuit connected to the mercury cell, is responsive to a change in the intensity of a light source, to transmit an electrical impulse to an actuator operable to change the reflectivity of the mirror. Mechanical and hydraulic actuators are disclosed.

BACKGROUND OF THE INVENTION

Field of the invention

This invention relates to mirror systems having a variable reflectivity and more particularly to a vehicle mounted system having a self-charging electrical system excited by the vibration of the vehicle and a photocell system responsive to a change in the intensity of a light source to transmit an electrical signal to an actuator operable to change the reflectivity of the mirror.

Field of the prior art

Rearview mirrors mounted on modern vehicles commonly employ a tiltable mirror element which is intended to be manually moved by the operator of the vehicle when the headlights of another vehicle, reflected in the mirror, produce an optical glare. Frequently, there are driving conditions which make it inconvenient for the operator of the vehicle to shift the mirror to a non-glare position. Furthermore, the operator is normally unable to determine that the condition creating the glare in the mirror has been terminated without manually shifting the mirror between its alternate positions.

Automatic dimmer controls have been suggested which utilize some form of an electrical actuator energized by a light detector and are operable to shift the mirror to a non-glare position. The problem with such conventional electrical devices is that they are connected to the vehicle's electrical system and therefore require various electrical connection wires connecting the dimmer controls to the electrical system. In addition to the costs of installation and maintenance, such electrical wires reduce the appearance of the dimmer controls, particularly when the mirror is mounted on the windshield.

The broad purpose of the present invention is to provide a mirror system having a self-contained, self-energizing dimmer control.

SUMMARY

The preferred embodiment of the present invention, which will be subsequently described in greater detail, comprises a piezo-electric generator incorporated in the mirror structure and which when excited by the vibrations of the vehicle converts mechanical energy to electrical energy. The electrical energy is preferably stored in a mercury cell.

A mirror unit having a movable control member assumes either of two states corresponding to the position of the control member, each state being associated with a different mirror reflectivity. An electrical actuating circuit taking its energy from the mercury cell is responsive to a change in the intensity of a light source to move the control member and therefore to control the reflectivity of the mirror.

The actuating circuit includes a bi-stable photocell circuit which responds to a change in the light source to transmit an output impulse to an actuator. The photocell circuit is preferably adapted to measure a change in the intensity of a light source but can be arranged to measure the intensity ratio of ambient illumination within the vehicle to the mirror surface illumination so that an output pulse is transmitted to the actuator when the ratio passes through a predetermined level. A combination switch and adjustment potentiometer can be adapted to permit adjusting the switching level or to lock the mirror in a selected position.

The actuator preferably takes the form of a rocker arm movable between a pair of alternate positions adjacent the poles of a magnet and corresponding to the alternate positions of a tiltable mirror and connected thereto. Coils mounted on the rocker arm are arranged to change polarity upon receipt of an output pulse from the photocell circuit. Each impulse received by the coils changes their polarity so that the arm shifts toward the alternate end of the magnet having an attractive polarity and thereby tilts the mirror to an alternate position.

An alternate embodiment of the invention employs a mirror unit comprising a housing having a transparent plate and a diaphragm mounted within the housing. The diaphragm has a light reflective surface confronting the inner face of the transparent plate. The housing, the transparent plate and the diaphragm form two separate fluid chambers, one chamber being between the diaphragm and the transparent plate and the second chamber being on the opposite side of the diaphragm.

A hydraulic bellows and switching arrangement is operable upon receiving an electrical pulse from the photocell circuit to deliver fluid behind the diaphragm so that it is flexed toward the transparent plate to form a light reflective combination. Upon receipt of a subsequent electrical pulse from the photocell circuit, the bellows shifts to its opposite position to evacuate the fluid behind the diaphragm and introduce fluid between the diaphragm and the transparent plate, so that the diaphragm is flexed away from the transparent plate to reduce the reflectivity of the unit. By adding a coloring agent to the fluid, any desired light attenuation can be obtained, or even color differentiation if desired.

A mirror unit with a single chamber for introducing fluid between the diaphragm and the transparent plate so that the diaphragm is flexed toward and away from the plate between reflective and non-reflective positions is another form of this concept.

The preferred embodiment of the present invention provides a relatively simple, self-contained, self-charging dimmer control for a mirror which can be developed with a high degree of reliability in a relatively small compact unit. By providing an electrical generating source based on vehicle vibrations, energy is available to the control system whenever the vehicle is operating as opposed to other forms of energy converters such as a solar generating system.

It is therefore an object of the present invention to provide an automatic mirror control system which responds to a change in the intensity of a light source to change the reflectivity of a mirror element.

It is another object of the present invention to provide a self-contained, self-charging dimmer control system for a mirror device mounted on a vehicle.

It is a still further object of the present invention to provide a self-energizing, self-contained light responsive control system for a mirror device mounted on a vehicle and having a generator excited by the vibrations of the vehicle to provide a mechanical to electrical source of energy for the control system.

It is still another object of the present invention to provide a mirror having a variable reflectivity and comprising a housing having a transparent plate for the reception of light, a diaphragm mounted within the housing with a light-reflective surface confronting the inner face of the transparent plate and means for introducing a light-attenuating fluid between the transparent wall and the diaphragm so that the diaphragm is flexed away from the transparent wall.

Still further objects and advantages of the present invention will readily occur to one skilled in the art to which the invention pertains upon reference to the following detailed description.

DESCRIPTION OF THE DRAWINGS

The description refers to the accompanying drawings in which like reference characters refer to like parts throughout the several views and in which:

FIG. 1 is a schematic view of a variable mirror unit connected to a self-charging, light-responsive actuating circuit and illustrating the preferred embodiment of the present invention;

FIG. 2 is a schematic diagram illustrating a piezo-electric generator for providing a source of electrical energy and a mechanical actuator for moving a tiltable mirror element;

FIG. 3 illustrates a preferred electrical circuit for actuating the rocker arm of FIG. 2; and FIG. 4 illustrates another form of actuator and mirror combination employing a fluid light-attenuating means.

DESCRIPTION OF THE PREFERRED EMBODIMENTS

Now, referring to the drawings, the preferred embodiment of the present invention comprises a transducer 10 of the type having a vibrating element which converts mechanical motion to electrical energy which is accumulated in a storage cell 12. The storage cell 12 forms a part of an actuating circuit 14. The actuating circuit includes a photocell circuit 16 and an actuator 18.

The photocell circuit 14 is of the type which measures the change in intensity of a light source 20 and provides an output pulse to the actuator 18 upon a predetermined change in the intensity. The circuit 14 could as well measure the intensity ratio of the ambient illumination at a first position and the surface illumination of a mirror 22, and trigger a pulse when a predetermined ratio is passed through.

The mirror 22 is of the type having a variable reflectivity and for purposes of illustration has alternate reflective states which are dependent upon the position of the output member 24 of the actuator 18. Thus, the output member 24 shifts between a position 26 or an alternate position 28 when the actuator 18 receives an electrical pulse from the photocell circuit 16. It can be seen that the embodiment of the invention illustrated in FIG. 1 comprises a self-contained, simple, automatic control for varying the reflectivity of the mirror 22 in response to a change in the intensity of the light source 20. The electrical energy for energizing the actuating circuit 14 is supplied by the transducer 10 which converts mechanical motion to stored electrical energy.

Now referring to FIG. 2, a self-contained dimmer control apparatus for a tiltable mirror element 30 is illustrated as mounted on a vehicle 32. A piezo-electric generator 34 is mounted so that it is excited by vibrations of the vehicle 32 and operable to generate electrical energy which is preferably stored in a mercury cell 36. Typically a bar of material such as lead titanate is mechanically stressed and the resulting voltage gradient taken as output. Such generators have an almost indefinite operating life.

It is to be understood that other forms of electrical storage cells could as well be used such as a silver-zinc or a silver-cadmium cell. The mercury cell 36 forms a part of an actuating circuit 38 which includes a bi-stable photocell circuit 40 which is similar to the photocell circuit 16 illustrated in FIG. 1. The circuit 40 responds to a change in the intensity of a light source 42 to transmit an electrical pulse to an insulated contact block 44.

A rocker arm 46 is mounted for pivotal movement and biased by spring means 48 toward alternate positions wherein it abuts a contact 50 or an opposite contact 52 mounted on block 44.

As can best be seen in FIG. 3, a pair of coils 54 and 56 are mounted on the rocker arm and arranged between the ends 58 and 60 of a permanent magnet. Upon receipt of an electrical pulse from the photocell circuit 40, the coil associated with the contact 50 or 52 which is in abutment with the rocker arm 46 assumes a polarity that reacts with the polarity of the ends 58 and 60 of the permanent magnet so that the rocker arm is pivoted to its alternate position. Thus, each incoming pulse energizes one of the coils and pivots the rocker arm.

The rocker arm is connected by a pin and slot arrangement 62 so that as the rocker arm 46 shifts, the mirror element 30 is tilted to its alternate position. It is to be understood that instead of a rocker arm, an over-center leaf spring could as well be employed. The input pulse from the photocell circuit 40 could as well result from a measure of the intensity ratio of the ambient illumination within the vehicle 32 and the surface illumination of the mirror element 30 so that the pulse is produced as the circuit passes a balance point in either direction. Furthermore, a combination switch and adjustment potentiometer could permit adjusting the switching level of the photocell circuit 40 to permit locking the mirror element 30 in either of its alternate positions.

An alternative form of actuator and mirror device is illustrated in FIG. 4. The mirror includes a housing 64 having a transparent section 66 such as a plate of glass or the like with flat inner and outer faces. A flexible diaphragm element 68 mounted within the housing 64 has a highly reflective surface confronting the inner face of the transparent section 66. A fluid chamber 70 is provided within the housing 64 behind the diaphragm 68 and a second fluid chamber 72 is provided intermediate the diaphragm 68 and the transparent section 66.

A hydraulic push-pull operator 74 preferably consists of a bellows having a first expansible chamber 76 connected to the chamber 70 and an opposite expansible chamber 78 fluidly connected to the chamber 72. A bi-stable actuator 80, upon receipt of a pulse from the photocell element, moves an actuating member 82 between two alternate positions. Thus, when the actuating member 82 is moved toward the left to reduce the volume of the bellows chamber 78, fluid is forced into the chamber 72 intermediate the diaphragm 68 and the transparent section 66. Preferably, a light-attenuating liquid is used which forces the diaphragm 68 away from the transparent section 66 so that the reflectivity of the mirror is reduced. When the actuating member 82 is moved toward its opposite alternate position, fluid is withdrawn from the chamber 72 and into the bellows chamber 78 and introduced behind the diaphragm 68 and into the chamber 70 from the bellows chamber 76 so that the reflective surface of the diaphragm 68 is flexed into a face-to-face relationship with the inner surface of the transparent member 66. The combination then becomes an efficient mirror.

The mirror effect depends or the flatness of the diaphragm, the thickness of the fluid film and the optical characteristics of the fluid. By adding a filtering colorant such as a blue coloring agent to the fluid, any desired light attenuation can be obtained and also the color differentiation desired may be obtained. It is to be understood that the bi-stable actuator 80 receives a pulse from a bi-stable photocell circuit such as a photocell circuit 40 as shown in FIG. 2 which is responsive to the change in the intensity of a light source.

What is claimed is:

1. A variable reflectivity mirror operable from a relatively high reflectivity state to a relatively low reflectivity state comprising: a housing having a flat interior surface, a flat transparent plate in said housing; a flexible diaphragm member disposed within said housing and peripherally joined thereto in substantially parallel relation with the plate and the housing surface and defining two separate chambers therein, the first of said chambers being confined between a face of said diaphragm and said plate and the second of said chambers being confined between the other face of said diaphragm and the surface of said housing; a light-reflective surface on the face of said diaphragm opposite said plate; means including a pair of ports communicating with the chambers adjacent the periphery of the diaphragm for differentially introducing and withdrawing fluids from said chambers to cause said diaphragm to flex and engage said plate when fluid is introduced in said second chamber and fluid is withdrawn from said first chamber and to flex away from said plate and engage said wall when fluid is introduced in said first chamber and fluid is withdrawn from said second chamber, at least the fluid in communication with said first chamber having light absorbing properties; control means for effecting said differential introduction and withdrawal of fluid from said chambers; and photosensitive means adapted to automatically operate said control means as a function of the intensity of a light source said control means comprises:

a deformable bellows member;
a first chamber in said bellows member in fluid communication with said first chamber in the housing;
a second chamber in said bellows member in fluid communication with said second chamber in the housing;
a bi-stable actuating electrical member operable by said photocell means and operatively connected to said bellows member and adapted to differentially reduce the volume of said first chamber in the bellows member while increasing the volume of said second chamber in the bellows member when in a first stable state and to differentially increase the volume of said first chamber in the bellows while decreasing the volume of said second chamber in the bellows member when in a second stable state.

2. The variable reflectivity mirror of claim 1 wherein said mirror is mounted on a vehicle and further comprising:

a piezo-electrical generator adapted to produce electrical energy when excited by the vibrations of said vehicle;
electrical energy storage means; and
means controlled by said photocell means for electrically connecting and disconnecting said bi-stable member to said electrical storage means for operating said bi-stable member.

References Cited

UNITED STATES PATENTS

| | | | |
|---|---|---|---|
| 683,164 | 9/1901 | Wideen | 350—295 |
| 2,656,764 | 10/1953 | Johnson | 350—289 |
| 3,000,262 | 9/1961 | Rabinow et al. | 350—289 |
| 3,001,196 | 9/1961 | McIlroy et al. | 350—295 |
| 3,013,392 | 12/1961 | Falge et al. | 350—289 |
| 3,030,527 | 4/1962 | Czyryk et al. | 310—8.7 |

PAUL R. GILLIAM, Primary Examiner

U.S. Cl. X.R.

350—289, 295